United States Patent Office 2,864,743
Patented Dec. 16, 1958

2,864,743

STERILE, BIOLOGICALLY ABSORBABLE POWDER ADAPTED FOR DUSTING AND SPRAYING, AND A PROCESS OF MAKING SAME

August Kottler and Heinz Scheffler, Biberach (Riss), Germany, assignors to Dr. Karl Thomae G. m. b. H., Biberach (Riss), Germany, a corporation of Germany No Drawing. Application March 22, 1954
Serial No. 417,946

Claims priority, application Germany March 23, 1953

7 Claims. (Cl. 167—58)

This invention relates to a new and improved powder base material adapted for dusting and spraying and more particularly to a powder material adapted for dusting and spraying that is sterile and is readily biologically absorbed, and to a process of making same.

Powder base materials adapted for dusting and spraying as they have been used heretofore in the pharmaceutical and cosmetic industries are, for the most part, composed of mineral material; for instance, of silicic acid or talc. Such powders have proven satisfactory with respect to the physical properties required of a powder adapted for dusting and spraying, and more particularly with respect to smoothness and soothing capacity, flowability, and adhesiveness. However, when using such mineral powders for specific purposes, such as in surgical operations and in the treatment of wounds and the like, grave risks are encountered because said mineral materials are chemically inert under physiological conditions and, therefore, are not absorbed by the living tissue. As a result thereof, adhesions of the tissue frequently occur in operative cases, besides other complications. Therefore, the medical literature (for instance, "Deutsche Medizinische Wochenschrift," vol. 76, pages 394–397) cautions against the use of talc for dusting surgical gloves.

It is evident that, besides the above-mentioned physical properties, a further requirement which must also be met by a powder which is to be used for such specific purposes is that it should be readily biologically absorbed. Furthermore, it is desirable to provide a sterile powder for such specific purposes. Moreover, such a powder must remain unaffected under the conditions of hot air, super-heated steam, and similar sterilization processes.

Many attempts have been made to supply or produce such a suitable biologically absorbable, sterile powder base material. Starch in its native state has been given special consideration for this purpose, since such native starch resembles talc very closely with respect to its adhesiveness and its smoothening effect. However, its high resistance to flow and especially its capacity to gelatinize or agglutinate in hot water prevent its use for such purposes. Furthermore, starch is an excellent nutrient medium for pathogenic microorganisms and is objectionable on this ground.

Processes are known to more or less eliminate the capacity of starch to swell and gelatinize by treatment with formaldehyde in alkaline or acid medium whereby its physical structure is preserved. However, the individual particles of products obtained according to said processes, especially when the treatment is in an alkaline medium, still have a considerable swelling power on boiling in water and, on account of such swelling power, tend to stick together. Starch treated with formaldehyde under acid conditions also tends to lump and stick together.

Another process of producing starch products with considerably reduced gelatinizing power comprises treatment of native starch in alkaline solution with a polyfunctional etherifying agent. According to said process it is possible to influence the degree to which the gelatinizing capacity is reduced by varying the amount of polyfunctional etherifying agent. The resulting highly etherified products, however, are not stable on exposure to superheated steam.

Neither formaldehyde-treated starch obtained according to the first mentioned process nor the etherified starch obtained according to the last mentioned process meets the required standards for dusting powders with respect to their flowability.

It is one object of our invention to provide a powder base material having good adhesive power and high smoothening properties surpassing even those of talc, said powder base material having a flowability almost equal to that of liquids, and being readily sterilizable, and biologically absorbable, and withstanding superheated steam sterilization without gelatinizing.

Another object of our present invention is to provide a simple and effective process of preparing such a powder base material suitable for surgical and biological uses and meeting the standards set therefor.

Another object of our invention is to provide a sterile, biologically absorbable powder which will remain sterile over long periods of time without further sterilization and which will have, in addition, all the advantages of the talc-based powders of the prior art.

Various other objects and advantages of our invention will become apparent as the description proceeds.

In the practice of our invention native starch is first treated in acid suspension with formaldehyde and the resulting formaldehyde-treated starch, isolated from said acid reaction mixture, is then reacted with halogenohydrins, such as, for instance, monochlorohydrin, epichlorohydrin, $\beta$-chloro ethanol or the like, in the presence of an excess of an alkaline agent. Said process yields sterile, biologically absorbable powder base materials adapted for dusting, spraying and other uses. Reaction with halogenohydrins is carried out either in aqueous suspension or in aqueous-alcoholic suspension. Subsequently to said etherification with halogenohydrin, the resulting reaction product is treated in alkaline medium, preferably in aqueous suspension, with the aqueous solution of a salt of a metal of the second or third group of the periodic system. Thereby it has proved to be of particular advantage to utilize the excess of alkaline agent remaining after alkaline reaction with halogenohydrin so that the intermediate etherified formaldehyde-treated starch need not be isolated before the treatment with said metal salts. An excess of metal salt over the alkaline agent present in the reaction mixture is used during said treatment.

Reaction with formaldehyde as well as reaction with halogenohydrins are preferably carried out in the presence of a water-miscible organic solvent. Thereby the advantage is achieved that said reaction can take place at elevated temperature without having to fear premature gelatinization or agglutination of the starch or formaldehyde-treated starch, respectively, under the influence of the alkaline agent or the formaldehyde.

Reaction with formaldehyde as well as reaction with halogenohydrin may be carried out by gradually adding said reactants portion by portion, as will be explained more in detail in Example 4 hereof.

The amount of formaldehyde to be reacted when carrying out the process according to the present invention is between about 30 mol percent and about 70 mol percent calculated for one starch unit, while the amount of halogenohydrin used is between about 4 mol percent and about 10 mol percent. During treatment with the metal salt, an amount of alkaline agent corresponding to an amount between about 0.1 mol percent and about 0.5 mol percent, calculated for one starch unit, should be present. The term "starch unit" as used in this specification and in the appended claims signifies the glucose unit ($C_6H_{10}O_5$) as is described on page 199 of the book "Chemistry and Industrie of Starch," second edition, Ralph W. Kerr, Ph. D., 1950, Academic Press Inc., New York.

Salt-like addition products are obtained by the process of our invention when reacting starch modified by formaldehyde and halogenohydrin treatment with metal hydroxides. Thereby especially favorable flowability is imparted to the resulting powder base materials.

The new products obtained by the process according to the present invention are still capable, especially on contact with water, of splitting off such an amount of formaldehyde that their sterility is ensured. This is very surprising when taking into account that the treatment with halogenohydrin and the salts of metals of the second or third group of the periodic system, respectively, is carried out in alkaline medium. It is possible to prove by means of Schiff's reagent that formaldehyde is actually split off. The new products, on microscopic examination, do not differ from native starch with respect to grain size and birefringence between crossed Nicol prisms. Boiling with water causes only very slight swelling of the individual particles of said products and they lose thereby their power of double bending of light.

According to a specific embodiment of the process of our invention, it is possible to boil the resulting reaction products with water until birefringence disappears.

Finally, it is also possible to subject the products obtained according to the present invention, if desired, to a subsequent treatment with formaldehyde. They may also be impregnated with suitable fatty materials; for instance, with stearic acid or palmitic acid. In general, said fatty material may be employed in an amount of at least 0.1% by weight calculated for the starch product.

The products obtained by the process of our invention are isolated from the reaction mixture according to conventional procedure; for instance, by filtration. They are subsequently dried at moderate temperature.

The following examples serve to illustrate more in detail the process according to our invention without, however, limiting the same thereto. In all said examples a formaldehyde-treated starch is used as starting material which is produced in the following manner:

EXAMPLE 1

*Production of formaldehyde-treated starch*

1 kg. of commercial grade corn starch is suspended in 2 liters of 70% methanol. 600 cc. of 30% aqueous formaldehyde solution and 50 cc. of 10% hydrochloric acid are added to said suspension. After stirring the reaction mixture for 30 hours at 40° C., the formaldehyde-treated starch is filtered off, washed with water, and dried at moderate temperature. The yield amounts to 850–900 g. In place of corn starch, it will be understood that wheat, rye, potato, rice and other starches may be used, and in place of hydrochloric acid other acids, such as sulphuric, phosphoric and the like, may be used.

EXAMPLE 2

*Reaction of formaldehyde-treated starch with monochlorohydrin and metal salt in alkaline solution*

10.9 g. of sodium hydroxide are dissolved in 500 cc. of 80% ethanol. 100 g. of formaldehyde-treated starch obtained according to Example 1 and 15 g. of monochlorohydrin are added to said solution. The reaction mixture is stirred for 7 to 10 hours while boiling under reflux. Thereafter the mixture is introduced into a solution of 35.5 g. of magnesium sulfate ($MgSO_4 \cdot 7H_2O$) in 300 cc. of water within five minutes while keeping the temperature between about 20° C. and about 40° C. The starch is then filtered off, washed with water, and dried at moderate temperature. Yield: 100 g. to 105 g. of a readily flowing powder which can be easily dusted and has a high smoothening power. Tests with Schiff's reagent are positive. No gelatinization takes place on boiling with water.

A product with about the same properties is obtained on using a solution of 30 g. of aluminum sulfate ($Al_2(SO_4)_3 \cdot 18H_2O$) in 300 cc. of water in place of the magnesium sulfate solution.

In general, halogenohydrins of lower aliphatic alcohols have proven suitable for use in the processes of our invention.

EXAMPLE 3

*Reaction of formaldehyde-treated starch with β-chloro ethanol and metal salt in alkaline solution*

11.4 g. of sodium hydroxide are dissolved in 500 cc. of 80% methanol. 100 g. of formaldehyde-treated starch obtained according to Example 1 and 15 g. of β-chloro ethanol are added to said solution. The mixture is boiled under reflux for 8 to 10 hours and is then worked up and reacted with metal salts in about the same manner as described in Example 2. Yield: 100 g. of a readily flowing powder which can be easily dusted. No gelatinization nor agglutination takes place on boiling with water. The test with Schiff's reagent is positive.

EXAMPLE 4

*Stepwise reaction of formaldehyde-treated starch with epichlorohydrin and metal salt in alkaline solution*

1.2 kg. of formaldehyde-treated starch obtained according to Example 1 are suspended in 2.4 liters of water. 24 g. of epichlorohydrin and 31.2 g. of sodium hydroxide dissolved in 300 cc. of water are gradually added in portions at room temperature within about 10 hours to said suspension, while stirring. Stirring of the reaction mixture is continued for about 14 hours. Thereafter, a solution of 240 g. of magnesium sulfate ($MgSO_4 \cdot 7H_2O$) in 700 cc. of water is introduced into said reaction mixture within about 2 hours. The treated starch is filtered off, washed with water, and dried at moderate temperature. Yield: 1150 g. of a free-flowing powder of high dusting and smoothening capacity. No gelatinization nor agglutination takes place on boiling with water. The test with Schiff's reagent is positive.

In place of magnesium sulfate there may be used a solution of 220 g. of aluminum sulfate

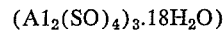

$$(Al_2(SO)_4)_3 \cdot 18H_2O$$

in 700 cc. of water.

EXAMPLE 5

*Aftertreatment with formaldehyde*

In order to subject starch products obtained according to the preceding Examples 2 to 4 to a subsequent treatment with formaldehyde, 1 kg. of the resulting powder is suspended in 2 liters of water while stirring. 20 cc. to 100 cc. of a 30% aqueous formaldehyde solution are added to said suspension and stirring of the mixture is continued for 2 to 6 hours at room temperature. Thereafter, the treated starch is filtered off, washed with water, and dried. The yield amounts to 980–1020 g.

EXAMPLE 6

*Impregnation with fatty material*

In order to impregnate the powders obtained according to the preceding Examples 2 to 4 which, if desired, may subsequently be treated with formaldehyde according to Example 5, 1 kg. of said modified starch is triturated with a solution of 1 g. to 10 g. of stearic or palmitic acid in 100 to 300 cc. of ethanol. The mixture is then dried. The powder obtained in this manner is strongly water-repellent.

In place of sodium hydroxide in the above examples, other alkali hydroxides and carbonates which do not combine with formaldehyde, such as potassium hydroxide, sodium carbonate and the like, may be used.

When producing the starting material as described in Example 1 and when subjecting starch modified according to this invention to an aftertreatment with formaldehyde as described in Example 5, it is of course possible to use aqueous formaldehyde solutions and also acids of different concentration than given in the examples. It is also possible to expose native starch in finely divided form to the action of formaldehyde vapors in the presence of acid vapors. The temperature during said reaction should preferably not exceed 40° C.

Etherification may be carried out with other halogenohydrins than those mentioned in the examples.

The halogenohydrins of lower aliphatic polyvalent alcohols, such as ethylene glycol, propylene glycols, butylene glycols, glycerol, and others, have proven especially suitable for use in the process of our invention. In place of the chlorohydrins used in the examples there may be employed, for instance, propylene chlorohydrin, ethylene and propylene bromohydrins, etc. As stated above, etherification can be carried out at room temperature or at elevated temperature, especially in the presence of a water-miscible organic solvent.

In place of magnesium sulfate and aluminum sulfate employed in the examples, there may be used other water-soluble salts of metals of the second and third group of the periodic system, such as beryllium, magnesium, calcium, strontium, barium chlorides, bromides, iodides, nitrates, aluminum chloride, fluoride, nitrate, the various alum compounds, zinc and cadmium chlorides, bromides, sulfates, nitrates, mercury chlorides, etc.

The end point of the reaction with metal salts is determined by removing a sample from the reaction mixture, washing it with water, and drying it. Testing said sample for its flowability, its dusting capacity, and other properties will allow determination of the proper end point of said reaction.

Aftertreatment with formaldehyde has for its purpose to further increase its resistance to swelling and gelatinizing on boiling with water.

While we have given certain preferred examples of our invention, it will be understood that various modifications and changes may be made therein without departing from the spirit of our invention or the scope of the following claims.

We claim:

1. As a new powder base material adapted for spraying and dusting, the addition product formed by a metal salt, selected from the group consisting of inorganic magnesium salts and aluminum salts, under alkaline conditions with the ether obtained by reacting a formaldehyde-starch condensation product containing from 30 to 70 mol percent formaldehyde per starch unit with a compound selected from the group consisting of epichlorohydrin, monochlorohydrin and β-chloro-ethanol.

2. As a new powder base material adapted for spraying and dusting, the addition product formed by a metal salt, selected from the group consisting of inorganic magnesium salts and aluminum salts, under alkaline conditions with the ether obtained by reacting a formaldehyde-starch condensation product containing from 30 to 70 mol percent formaldehyde per starch unit with a compound selected from the group consisting of epichlorohydrin, monochlorohydrin and β-chloro-ethanol, said powder base having 0.1% by weight of a fatty acid selected from the group consisting of stearic acid and palmitic acid homogeneously dispersed therein.

3. As a new powder base material adapted for spraying and dusting, the addition product formed by a metal salt, selected from the group consisting of inorganic magnesium salts and aluminum salts, under alkaline conditions with the ether obtained by reacting a formaldehyde-starch condensation product containing from 30 to 70 mol percent formaldehyde per starch unit with monochlorohydrin.

4. As a new powder base material adapted for spraying and dusting, the addition product formed by an inorganic magnesium salt under alkaline conditions with the ether obtained by reacting a formaldehyde-starch condensation product containing from 30 to 70 mol percent formaldehyde per starch unit with monochlorohydrin.

5. As a new powder base material adapted for spraying and dusting, the addition product formed by an inorganic aluminum salt under alkaline conditions with the ether obtained by reacting a formaldehyde-starch condensation product containing from 30 to 70 mol percent formaldehyde per starch unit with monochlorohydrin.

6. As a new powder base material adapted for spraying and dusting, the addition product formed by an inorganic magnesium salt under alkaline conditions with the ether obtained by reacting a formaldehyde-starch condensation product containing from 30 to 70 mol percent formaldehyde per starch unit with β-chloroethanol.

7. As a new powder base material adapted for spraying and dusting, the addition product formed by an inorganic magnesium salt under alkaline conditions with the ether obtained by reacting a formaldehyde-starch condensation product containing from 30 to 70 mol percent formaldehyde per starch unit with epichlorohydrin.

References Cited in the file of this patent

UNITED STATES PATENTS

| | | |
|---|---|---|
| 415,351 | Quaglio | Nov. 19, 1889 |
| 2,417,611 | Pierson | Mar. 18, 1947 |
| 2,469,957 | Fenn | May 10, 1949 |
| 2,614,945 | Krisan | Oct. 21, 1952 |
| 2,626,257 | Caldwell et al. | Jan. 20, 1953 |

OTHER REFERENCES

Drug and Cos. Ind., July 1953, vol. 73, No. 1, page 89.

Graham et al.: J. Pharm. and Pharmacol., June 1951, vol. 4, No. 6, pp. 392–398.